United States Patent
Kawabata et al.

(10) Patent No.: US 7,814,553 B2
(45) Date of Patent: Oct. 12, 2010

(54) ACCESS CONTROL SYSTEM, ACCESS MANAGING METHOD, IMAGE FORMING DEVICE AND COMPUTER PROGRAM PRODUCT

(75) Inventors: Hiroyuki Kawabata, Kawanishi (JP); Hisashi Uchida, Kuze-gun (JP); Kiyoshi Emori, Takatsuki (JP); Kazuo Inui, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 919 days.

(21) Appl. No.: 10/953,284

(22) Filed: Sep. 30, 2004

(65) Prior Publication Data

US 2005/0273620 A1    Dec. 8, 2005

(30) Foreign Application Priority Data

Jun. 2, 2004    (JP)    ............................. 2004-164655

(51) Int. Cl.
*G06F 7/04*    (2006.01)
*G06F 21/00*    (2006.01)

(52) U.S. Cl. ........................................ 726/27; 713/182
(58) Field of Classification Search .................... 726/7, 726/27; 713/201, 182
See application file for complete search history.

(56) References Cited

U.S. PATENT DOCUMENTS

| | | | | |
|---|---|---|---|---|
| 4,899,299 | A * | 2/1990 | MacPhail | 707/204 |
| 5,144,556 | A * | 9/1992 | Wang et al. | 707/9 |
| 5,502,766 | A * | 3/1996 | Boebert et al. | 713/193 |
| 5,715,403 | A * | 2/1998 | Stefik | 705/44 |
| 5,948,064 | A * | 9/1999 | Bertram et al. | 709/225 |
| 5,951,638 | A * | 9/1999 | Hoss et al. | 709/206 |
| 6,151,269 | A * | 11/2000 | Dosaka et al. | 365/233 |
| 6,236,996 | B1 * | 5/2001 | Bapat et al. | 707/9 |
| 6,332,146 | B1 * | 12/2001 | Jebens et al. | 707/104.1 |
| 6,539,480 | B1 * | 3/2003 | Drews | 713/191 |

(Continued)

FOREIGN PATENT DOCUMENTS

JP    9-307582 A    11/1997

(Continued)

OTHER PUBLICATIONS

Notification of Reasons for Refusal dated Mar. 20, 2007; and translation thereof.

*Primary Examiner*—Techane J Gergiso
(74) *Attorney, Agent, or Firm*—Buchanan Ingersoll & Rooney PC

(57) ABSTRACT

A multifunction device includes a storage controlling portion for causing document data, which are to be given by a user who has logged in to a different user, to be stored in a box owned by the different user, and an access authority setting portion for granting an access authority to make access to the document data, to both of the users in the event that the document data are stored in the box and, also, for erasing the access authority, which has been granted to the user, when the user logs out. Thus, in the event that the user stores the data such as document data or the like in the box other than his or her personal box, the user can be permitted to make access to the data, while the owner of such box is warranted a high security and conveniences of data management are ensured.

12 Claims, 13 Drawing Sheets

U.S. PATENT DOCUMENTS

| | | | |
|---|---|---|---|
| 6,609,115 B1* | 8/2003 | Mehring et al. | 705/51 |
| 6,917,939 B1* | 7/2005 | Baer et al. | 707/10 |
| 6,978,381 B1* | 12/2005 | Te et al. | 726/18 |
| 6,990,574 B2* | 1/2006 | Bidarahalli et al. | 713/2 |
| 7,058,971 B1* | 6/2006 | Horikiri | 726/7 |
| 7,124,305 B2* | 10/2006 | Margolus et al. | 713/193 |
| 7,159,175 B2* | 1/2007 | Ishii et al. | 715/716 |
| 7,185,192 B1* | 2/2007 | Kahn | 713/155 |
| 7,287,053 B2* | 10/2007 | Bodin | 709/204 |
| 7,353,252 B1* | 4/2008 | Yang et al. | 709/204 |
| 7,395,365 B2* | 7/2008 | Fujita et al. | 710/313 |
| 7,484,106 B2* | 1/2009 | Rhoten et al. | 713/193 |
| 2002/0078378 A1* | 6/2002 | Burnett | 713/201 |
| 2002/0138557 A1* | 9/2002 | Mukaiyama et al. | 709/203 |
| 2002/0141354 A1* | 10/2002 | Niiya et al. | 370/260 |
| 2002/0194294 A1* | 12/2002 | Blumenau et al. | 709/213 |
| 2003/0065766 A1* | 4/2003 | Parry | 709/224 |
| 2003/0110131 A1* | 6/2003 | Alain et al. | 705/51 |
| 2003/0220838 A1* | 11/2003 | Ishii et al. | 705/14 |
| 2004/0143743 A1* | 7/2004 | Margolus et al. | 713/176 |
| 2005/0071280 A1* | 3/2005 | Irwin et al. | 705/59 |
| 2005/0114672 A1* | 5/2005 | Duncan et al. | 713/182 |
| 2005/0273620 A1* | 12/2005 | Kawabata et al. | 713/182 |
| 2006/0143189 A1* | 6/2006 | Imaeda et al. | 707/100 |
| 2006/0190995 A1* | 8/2006 | Horikiri | 726/7 |

FOREIGN PATENT DOCUMENTS

| | | |
|---|---|---|
| JP | 11-134294 | 5/1999 |
| JP | 11-161449 | 6/1999 |
| JP | 2000-322352 A | 11/2000 |
| JP | 2001-333229 | 11/2001 |
| JP | 2002-142061 | 5/2002 |
| JP | 2003-281277 A | 10/2003 |
| JP | 2003-296456 A | 10/2003 |

* cited by examiner

| | PRIORITIZED PERSON |
|---|---|
| BOX B1 | CREATOR |
| BOX B2 | CREATOR |
| BOX B3 | RECEIVER |
| ⋮ | ⋮ |
| BOX BT | CREATOR |

|  | USER U1 | USER U2 | USER U3 | ... |
|---|---|---|---|---|
| BOX B1 | R,A,W,D | A | A | ... |
| BOX B2 | A | R,A,W,D | A | ... |
| BOX B3 | A | A | R,A,W,D | ... |
| ⋮ | ⋮ | ⋮ | ⋮ | |
| TEMPORARY STORAGE BOX BT | A | A | A | |

| DOCUMENT NAME OR JOB NAME | USER U1 | USER U2 | USER U3 | ... |
|---|---|---|---|---|
| DOCUMENT D11 | − | R,W,D | − | ... |
| DOCUMENT D12 | R | − | R,W,D | ... |
| DOCUMENT D21 | R,W,D | R | − | ... |
| DOCUMENT D31 | R,W,D | − | − | ... |
| JOB J1 | R,W,D,Tr,Tw,Td | − | − | ... |
| ⋮ | ⋮ | ⋮ | ⋮ | ⋮ |

ACCESS CONTROL SYSTEM, ACCESS MANAGING METHOD, IMAGE FORMING DEVICE AND COMPUTER PROGRAM PRODUCT

This application is based on Japanese Patent Application No. 2004-164655 filed on Jun. 2, 2004, the contents of which are hereby incorporated by reference.

BACKGROUND OF THE INVENTION

1. Field of the Invention

The present invention relates to an apparatus for and a method of managing data stored in a storage device.

2. Description of the Prior Art

In recent years, an image forming device having a box function is wide-spreading, of a type with which not only can users of the image forming device create their own storage areas known as "personal box", but they can also utilize their own personal boxes to store their own document data such as, for example, image data and/or text data.

When it comes to the image forming device, the functionality thereof has now come to be diversified and the image forming device having scanner, fax, printer and networking functions is well known in the art. Such image forming device is generally referred to as a multifunction device or an MFP (a multifunction peripheral). In order to execute a particular job with the multifunction device or the MFP, job data indicative of the contents of such particular job are accommodated in a predetermined box.

Various methods of utilizing those functions efficiently have also been suggested in the art. For example, Japanese unexamined patent publication No. 11-134294, laid open to public inspection in 1999, discloses the system in which when an log-out instruction is given, a decision is made to determine if there is any previously instructed, but unfinished job. Should the unfinished jobs be found, indication is made to display a list of the unfinished job to the user to thereby avoid the possibility that the user without knowing the presence of the unfinished job may log out.

Japanese unexamined patent publication No. 11-161449, laid open to public inspection in 1999, discloses the system in which in the event that a print server detects the work station being logged out, the electric power supply of the printer device is switched from a normal mode to a power saving mode, and which thus enables the printer device to perform an efficient control of the electric power consumed by the printer device.

Japanese unexamined patent publication No. 2002-142061, laid open to public inspection in 2002, discloses the system in which in the event that any event is found remaining unprocessed to the particular client, such unprocessed event can be processed when such client logs in.

Also, Japanese unexamined patent publication No. 2001-333229, laid open to public inspection in 2001, discloses the system in which after a portion of the image data forwarded from a host computer, which portion contains the information on the user, has been extracted and the contents descriptive of the information on the user has subsequently been recognized, comparison is made to determine if the contents of the information on the user are identical with those of the user having logged in. In the event that the contents of the information on the user have been ascertained identical with those of the user having logged in, the image data so forwarded from the host computer is displayed by a display device and/or stored in an external storage device. However, in the event that the contents of the information on the user have been ascertained failing to match with those of the user having logged in, the image data so forwarded is discarded. In this way, capture of a document not desired by the user is inhibited to thereby provide a high security.

With the above described box function, the user can exchange document data with another user when such user stores the document data in a personal box unique to such another user or when such another user stores document data in a personal box unique to such user. As a matter of design, in terms of the security and data consistency, no one other than the limited users such as, for example, the owner of the personal box and the administrator can make access to such personal box. Thus, after the document data have been stored in the personal box owned by another user, the user can no longer make access to the document data stored by such user.

Under these circumstances, once the document data have been stored, the system disclosed in any one of the previously discussed unexamined patent publications is incapable of allowing the user to make access to the document data. Even though the need is arisen to ascertain the contents of such document data and/or to complete, i.e., correct or delete the text contained in such document data.

Although it may be contemplated to provide the user, who has stored the document data, with the access authority, this is uncalled for the user for whom the document data have been addressed because of security and data management.

In view of the foregoing problems and inconveniences, the present invention is devised to provide the system in which, in the event that a certain user stores document data in a personal box other than that owned by such certain user, such certain user can make access to such document data without detrimentally affecting the security and the convenience of data management.

SUMMARY OF THE INVENTION

To this end, the access control system in accordance with one aspect of the present invention is used for managing an access authority with respect to data stored in a storage device and includes a storage controlling portion for storing in the storage device, to-be-given data, which are data to be given from a user who has logged in the access control system to a different user, and an access authority managing portion for granting an access authority to make access to the to-be-given data, to both of the user, who is a provider of the data, and the different user, who is given the to-be-given data, in the event that the to-be-given data are stored in the storage device and, also, for erasing the access authority, which has been granted to the user, when the user logs out the access control system.

The access control system referred to above may be applied to an image forming device such as, for example, an MFP having a plurality of data storing boxes one for each of users. In such case, the image forming device is provided with a storage controlling portion for causing data, which are to be given by a first user who has logged in the image forming device to a second user, to be stored in the storage area owned by the second user, and an access authority managing portion for granting an access authority to make access to the data to be given by the first user, to both of the first user and the second user who is an owner of the storage area in the event that the data to be given by the first user are stored in the storage area and, also, for erasing the access authority, which has been granted to the first user, when the first user logs out the image forming device.

The access authority managing portion may grant only a read authority to read the data to the second user as the access authority when the data are stored in the storage area, but grant a full access authority as the access authority to the second user when the first user logs out the image forming device. Alternatively, the access authority managing portion may erase the access authority granted to the first user, when the second user makes access to the data regardless of the timing at which the first user logs out the image forming device.

Where the image forming device is provided with a process executing portion for executing a process based on job data, the image forming device may include a storage controlling portion for storing in a predetermined storage area in a storage device, the job data descriptive of contents of the process designated by a user who has logged in the image forming device, and an access authority managing portion for granting an access authority for enabling the user, who designated the process, to make access to the job data, to such user when the job data are stored in the predetermined storage area and, also, for erasing the access authority when such user logs out the image forming device.

According to the present invention, in the event that a certain user stores data such as, for example, document data or the like, in a box other than his or her personal box, such certain user can be permitted to make access to the data, while a high security and conveniences of data management are ensured.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4 is a chart showing an example of priority information;

FIG. 5 is a chart showing examples of information on the box access authority:

FIG. 6 is a chart showing examples of information on the data access authority;

DESCRIPTION OF THE PREFERRED EMBODIMENTS

Figure 1:
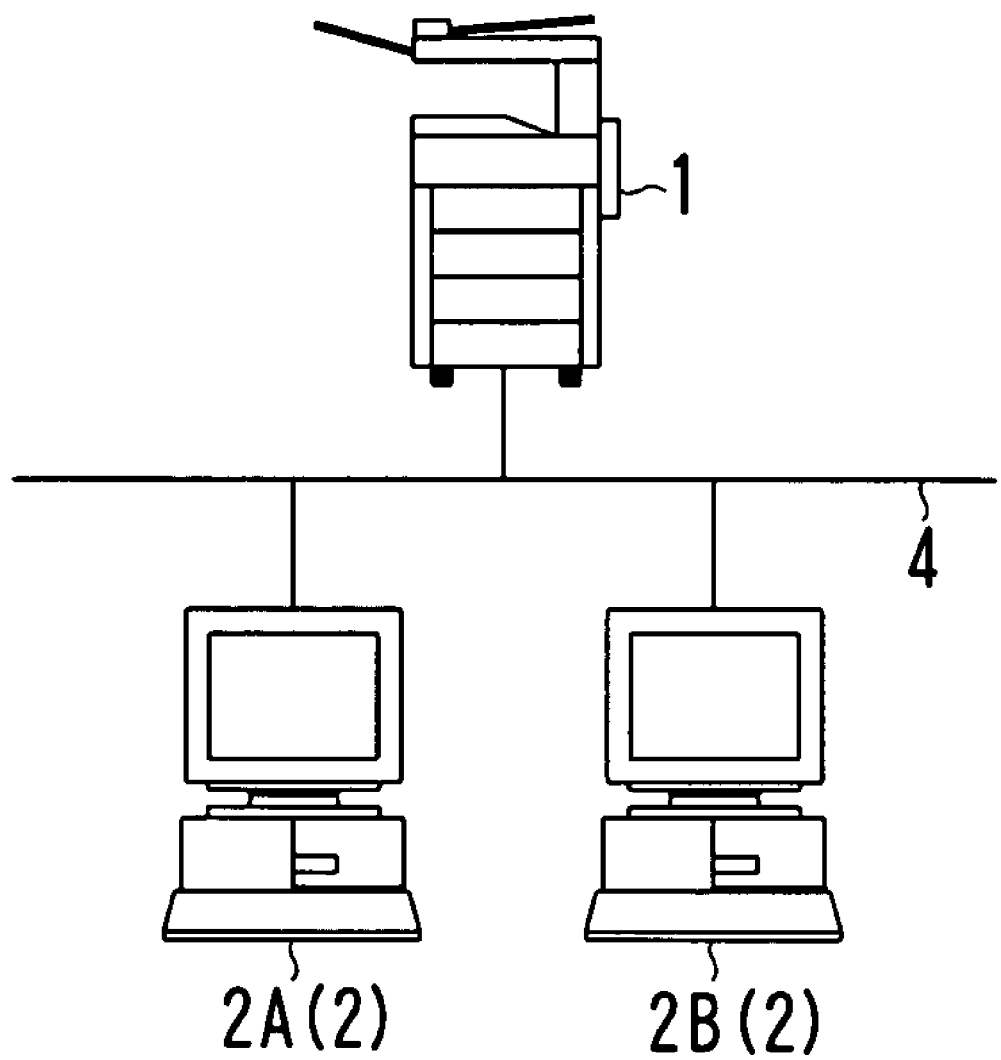
FIG. 1 is a schematic diagram showing an example of the network system.
Figure 2:
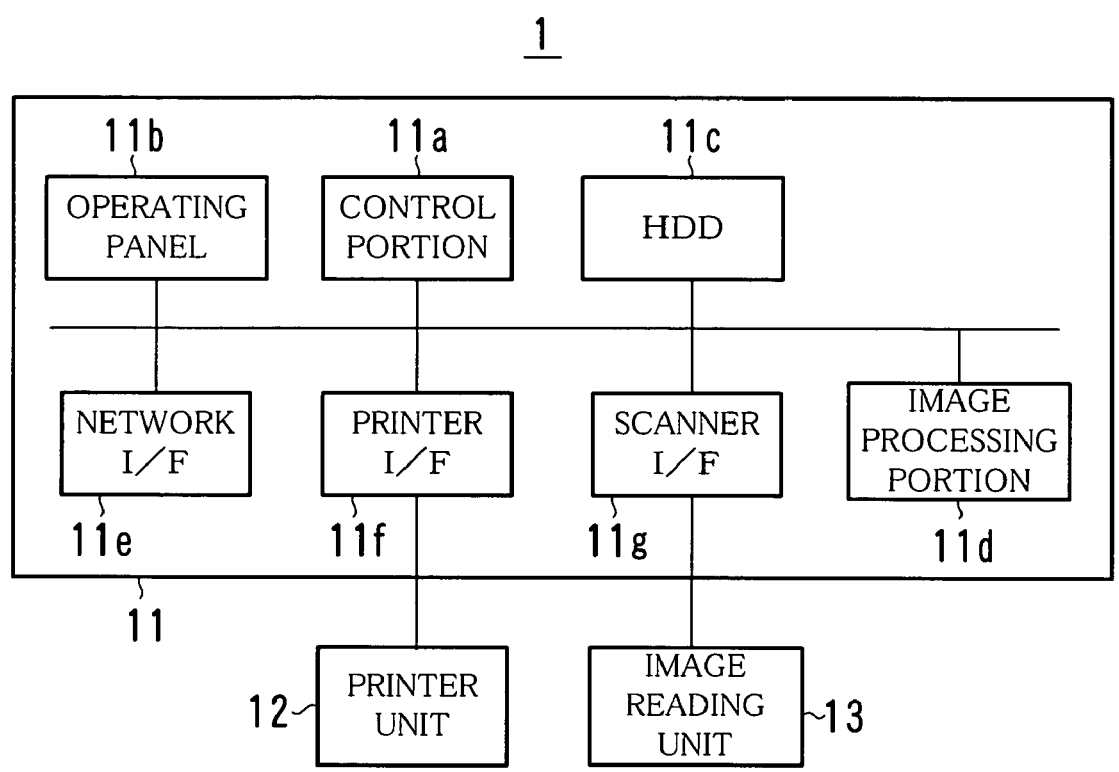
FIG. 2 is a schematic diagram showing an example of the structure of a hardware architecture of a multifunction device.
Figure 3:
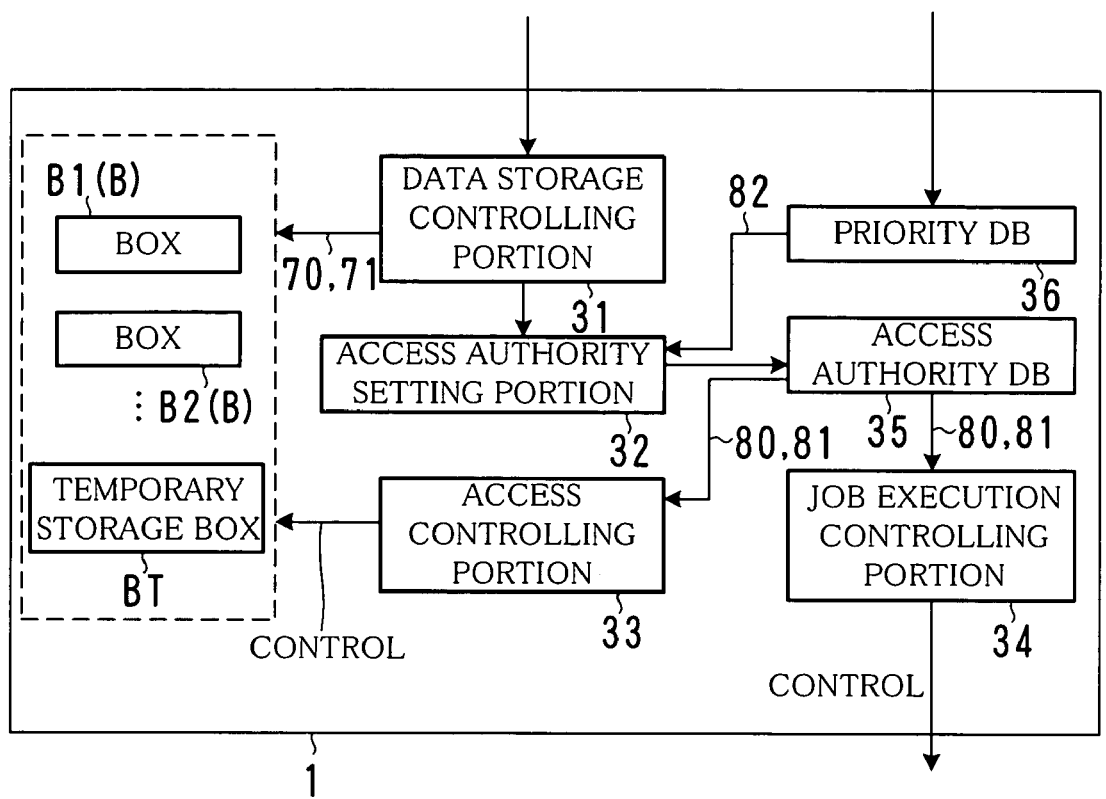
FIG. 3 is a schematic diagram showing an example of the functionality of the multifunction device.

Referring to FIGS. 1, 2 and 3 showing the network system, the structure of a hardware architecture of a multifunction device 1, and the functionality of the multifunction device 1, respectively, the network system generally identified by 100 includes, as best shown in FIG. 1, a multifunction device 1, a plurality of, for example, two terminals generally identified by 2, but individually identified respectively by 2A and 2B, and a communication network 4. The multifunction device 1 and the terminals 2 are connected with each other through the communication network 4. The communication network 4 referred to above may be LAN, the Internet, exclusive lines and/or public circuit.

The multifunction device 1 includes, as best shown in FIG. 2, a control unit 11, a printer unit 12, an image reader unit 13 and others. This multifunction device 1 is an image forming device of a kind, in which a plurality of functions, for example, those as a copier, a printer, a scanner, a fax and a document server, are integrated, and is generally referred to as a MFP (multifunction peripheral).

The "document server" referred to above is functionality of allocating personal boxes to users or groups of those users and of storing and supervising document data such as, for example, image data in relation to the personal boxes allocated to the users or the groups of those users. This is often referred to as the "box functionality". The "personal box" referred to above is a storage area defined in a storage device such as a hard disc 11c for accumulating or storing the document data or the like, and corresponds to the "folder" or "directory" employed in personal computers. The access authority by which access can be made to the personal box or the document data stored therein may be set to the personal box or the data stored therein, so that different users can make access thereto. As such, the multifunction device 1 may be said to be an access control system for supervising the access authority with respect to the data accumulated in the personal box. For the purpose of description of the present invention, the personal box is hereinafter referred to as "box B".

The image reader unit 13 is made up of a document support or table, an image sensor such as, for example, a CCD and an automatic document feeder and is operable to form an image data by optically scanning an image of the document and converting it into electronic data. In other words, the image reader unit 13 is nothing other than a scanner. The printer unit 12 may be in the form of an ink jet printer or printing engine or a laser printer capable of printing an image on a predetermined sheet or paper based on printing data.

The control unit 11 is made up of a control portion 11a, an operating panel 11b, a hard disc (HDD) 11c, an image processing portion 11d, a network interface 11e, a printer interface 11f, a scanner interface 11g and others and is operable to control the printer unit 12 and the image reader unit 13.

The network interface 11e is a communication network operable to interface with another multifunction device 1 or the terminal 2 through the communication line 4. For this network interface 11e, a network interface card or modem is generally employed. The printer interface 11f and the scanner interface 11g are utilized to provide connectivity with the printer unit 12 and the image reader unit 12, respectively.

The operating panel 11b provides a user interface (UI) used for the convenience of the user of the multifunction device 1 and includes a liquid crystal display and an operating console. As a matter of design, the liquid crystal display is used to provide a visual indication of an operating or setting screen. The operating console includes a plurality of buttons such as, for example, ten numeric input keys and a start button. It is to be noted that for the operating panel 11b, a touch panel known to those skilled in the art.

The image processing portion 11d is capable of performing a correcting process such as, for example, color correction of images, rotation of images and inclination correction; a process of converting image data or facsimile data, which have been described in page description language that is compatible with the multifunction device 1, into bit map data; a process of converting image data captured from the image reader unit 13 or the like into image data or facsimile data in page description language compatible therewith, and so on.

The control portion 11a is made up of a central processing unit (CPU), a random access memory (RAM) and various circuits for controlling various parts of the multifunction device 1. The hard disc 11c has various programs such as, for example, an operating system (OS) and firmware, and data stored therein. The firmware includes not only such programs required to execute the basic functionality of the multifunction device 1 including, for example, functions as a copier, a printer, a scanner, a fax, a document server and others, but also programs required to realize the functions of a data storage controlling portion 31, an access authority setting portion 32, an access controlling portion 33, a job execution controlling portion 34, an access authority database 35, a priority database 36 and others as shown in FIG. 3. Those programs or data are, if so required, loaded into the RAM and are executed by the CPU. Some or all of those programs may be stored in a read-only memory, an nonvolatile memory or the like. Also, some or all of the functions of various parts shown in FIG. 3 may be so designed and so tailored as to be executed by a processor (control circuit).

The user can store document data 70 in the box B created only for his or her own. Also, the user can provide another user with the document data 70, created or otherwise compiled in any way whatsoever by such user, by causing such document data 70 to be stored in the box B for use by such another user. Also, by storing job data 71 in a temporary storage box BT, a process of data transfer or the like can be executed by the multifunction device 1. The user can perform, through the operating panel 11b of the multifunction device 1, an operation to store the data in the box B or the temporary storage box BT. This can also be accomplished through any of the terminals 2.

FIG. 4 illustrates examples of priority information 82. FIGS. 5 and 6 illustrate examples of information on the box access authority and examples of information on the data access authority, respectively. In describing contents of the various processes performed in the various parts shown in FIG. 3, let it be assumed that boxed B1, B2 and so on are allocated to users U1, U2 and so on, respectively.

The priority database 36 stores therein such priority information 82 as shown in FIG. 4. The priority information 82 is descriptive of identifies of those granted priority as to the access authority for each boxes and is utilized for the process performed in the access authority setting portion 32. This priority information 82 can be set by the owner of a particular box when he or she manipulates the corresponding terminal 2. The details of use of the priority information 82 will be described later.

The access authority database 35 contains such box access authority information 80 as shown in FIG. 5 and such data access authority information 81 as shown in FIG. 6 and performs management of the access authority with respect to the boxes B, the temporary storage box BT, document data 70 stored in each of the boxes B and job data 71 stored in the temporary storage box BT.

The box access authority information 80 shown in FIG. 5 is representative of contents of access authorities allocated to the users for each of the boxes including the user's boxes B and the temporary storage box BT. The symbol "R" used in FIG. 5 stands for the read authority, i.e., the authority to read the document data 70 or the job data 71 stored in the box. By way of example, since R is set to the user U1 as to his or her box B1, such user owns the read authority to read the document data 70 or the like stored in the box B1. The user having the read authority can review or ascertain the contents by opening the document data 70.

The symbol "W" used in FIG. 5 stands for the write authority to write in the document data 70 or the job data 71 stored in the box. The user entitled to the write authority can open the document data 70 or the like to perform an updating job such as amendment to part or entirety of the contents, making an addition or deletion with respect to the document data 70.

The symbol "D" also used in FIG. 5 stands for the delete authority to delete the document data 70 or the job data 71 stored in the box. The user entitled to the delete authority can delete or erase those document data 70 or the like.

The symbol "A" also used in FIG. 5 stands for the add authority to add the document data 70 or the job data 71 to the box. The user entitled to the add authority can add new document data 70 or new job data 71 to the box. As shown in FIG. 5, each of the users has the full access authority to do every things such as reading, updating, deleting and adding in relation to the box B owned by him or herself. Also, the user having the full access authority also has only the add authority in relation to the box B owned by any other user. Accordingly, when document data 70 is added to and hence stored in the box B owned by any other user, the document data 70 can be given to such any other user.

The data access authority information 81 shown in FIG. 6 is descriptive of contents of the access authority given to each of the users in connection with the document data 70 or the job data 71. As explained above, the symbols "R", "W", and "D" stand for the read, write and delete authorities to perform the relevant job on the document data 70 or the job data 71. By way of example, the user U2 is given R, W and D in connection with the document data 70 bearing the document name of "Document D11" and, therefore, he or she has the read, write and delete authorities, that is, the full access authority as far as such document data 70 is concerned.

Where the job data 71 is intended for transfer of data to a designated addressee, such access authorities as "Tr", "Tw" and "Td" can be set up. The symbol "Tr" stands for the addressee's read authority and the user entitled to this read authority can display the addressee on the screen for reconfirmation. The symbol. "Tw" stands for the addressee's write authority and the user entitled to this write authority can perform addition or alteration of the addressee. The symbol "Td" stands for the addressee's delete authority and the user entitled to this delete authority can delete the addressee.

The symbol "-" stands for the compliance with the box access authority information 80 of the box in which the document data 70 or the job data 71 are stored. For example, let it be assumed that the document data 70 under the name of the "Document D11" are stored in the box B1. Since in this case, the user U1 is set with "-" with respect to such document data 70, the box access authority information 80 of the box B1 is applied as the access authority to make access to such document data 70. Accordingly, the user U1 is given the read, write and delete authorities with respect to the document data 70. On the other hand, the user U3 has only the add authority applicable to such document data 70 and is, accordingly, given no access authority applicable to such document data 70.

It is to be noted that the data access authority information 81 is applicable in preference to the box access authority information 80. By way of example, although the user U2 is given only the add authority with respect to the box B1, he or she has the read, write and delete authorities with respect to the document data 70 named "Document D11". In such case, so far as the document data 70 are concerned, the data access authority information 81 is so preferentially applied that the user U2 can be given the read, write and delete authorities with respect to such document data 70.

Referring to FIG. 3, the data storage controlling portion 31 operates in response to a command given by the user to store the document data 70 in one of the boxes B or to store the job data 71 in the temporary storage box BT. The access authority setting portion 32 performs a process of setting the access authority by changing the contents of one of the box access authority information 80 and the data access authority information 81.

The details of the sequence of each of the processes performed respectively by the data storage controlling portion 31 and the access authority setting portion 32 will now be described. Let it be assumed that as a result of the user U2 manipulating the terminal 2, a command is issued to store the document data 70 named "Document D12" in the box B1 owned by the user U1.

Under these circumstances, the data storage controlling portion 31 receives the document data 70 from the terminal 2 and controls the network interface 11e and the hard disc 11c to allow the document data 70 to be stored in the box B1.

On the other hand, the access authority setting portion 32 changes the contents of the data access authority information 81 in the following manner so that setting of the access authority to make access to the document data 70, i.e., "Document D12", that has been newly stored (or added) therein is performed. Specifically, in the first place, the data access authority information 81 are set so that the full access authority can be given to the user who has added such document data 70. In other words, the contents of the data access authority information 81 are changed or otherwise altered so that the read, write and delete authorities can be given to the user U2 with respect to the particular document data 70.

Also, in the event that the priority information 82 indicates that the person given priority to the box B1 to which the document data 70 have been added is a document "creator" of such document data 70, the data access authority information 81 is changed or otherwise altered so that only the read authority with respect to such document data 70 can be given to the user U1 who is the owner of the box B1. On the other hand, in the event that the priority information 82 indicates that such prioritized person is a "receiver", the data access authority information 81 are so set that the full access authority can be given to the user U1 as is the case with that to the user U2.

Also, assuming that, for example, the user U2 inputs a command that the document data 70 stored in his or her own box B2 should be transferred to any other user by means of an electronic mail, the data storage controlling portion 31 stores in the temporary storage box BT the job data 71 required to perform the process of transferring the document data 70 to such any other user. The access authority setting portion 32 then performs setting of the data access authority information 81 so that the full access authority can be given to the user U2 with respect to such job data 71.

The access authority setting portion 32 can perform the process of changing the contents of the data access authority information 81 even in the following case. Specifically, in the event that the user who has added the document data 70 to the box B owned by any other user logs out, the access authority setting portion 32 changes the contents of the data access authority information 81 so that the access authority given to such user in connection with such document data 70 can be deleted.

In other words, in the case of the document data 70 named "Document D12" as hereinbefore discussed, the access authority given to the user U2 in connection with the document data 70 is deleted at the moment the user U2 logs out. Also, where the priority information 82 (see FIG. 4) indicate that the person prioritized to the box B1, to which the document data 70 have been stored, is a document "creator", the data access authority information 81 is changed or otherwise altered so that the access authorities other than the read authority, that is, the write and delete authorities can be given to the user U1, that is, the owner of the box B1, in connection with such document data 70. In this way, the full access authority can be given to the user U1.

Similarly, where the user who has instructed to execute the process logs out, the data access authority information 81 is changed or otherwise altered so that the access authority given to the user in connection with the job data 71 associated with such instruction can be deleted.

On the other hand, where the owner of the box B to which the document data 70 have been added makes access to the newly stored document data 70, the access authority setting portion 32 changes or otherwise alter the data access authority information 81 so that if the priority information 82 indicates that the person prioritized to such box B is a "receiver", so that the access authority given to the user, who has added the document data 70, to enable him or her to make access to the document data 70 may be deleted. Should such prioritized person be a document "creator", no data access authority information 81 is changed or altered in any way whatsoever.

The access controlling portion 33 operates, based on the box access authority information 80 and the data access authority information 81, to control the access to the document data 70 and the job data 71. In other words, in the event that the user makes a request to access the document data 70 or the job data 71, the access controlling portion 33 refers to the box access authority information 80 and the data access authority information 81 to determine if the access authority to make access to such data is given to such user.

In the event that the access controlling portion 33 determines that such user has the access authority, access is enabled and a process appropriate to the access authority is executed. By way of example, where such user has only the read authority, the access controlling portion 33 is set under a read mode to execute the process to open the document data 70 or the job data 71. On the other hand, where the access is made to request the deletion, the document data 70 or the job data 71 are deleted if the user has the delete authority. Without the access authority, such access will be rejected.

Also, the data storage controlling portion 31 performs an access control even prior to execution by the data storage controlling portion 31 to store the document data 70 or the job data 71 in the box or the temporary storage box BT as hereinbefore described. In other words, where the user attempting to store the document data 70 or the like has no add authority to add them to the box to which they are desired to be stored, access to such box B is rejected. In such case, the respective processes to be performed by the data storage controlling portion 31 and the access authority setting portion 32 will not be executed. However, where such user has the add authority, the processes are executed in the manner described above.

The job execution controlling portion 34 controls various parts of the multifunction device 1 on the basis of the job data 71 stored in the temporary storage box BT to thereby execute jobs. By way of example, the document data 70 are transferred to an electronic mail address, a telephone dial number of the fax terminal or the IP address of a designated addressee (FTP, File Transfer Protocol) server or a SMB (Server Message Block) server, or execute a job such as printing on the basis of the document data 70.

It is, however, to be noted that so long as the user who is a requester of such job data 71 logs in, execution of the process (job) based on such job data 71 is reserved and, instead, such job is executed after such user has logged out.

Figure 7:
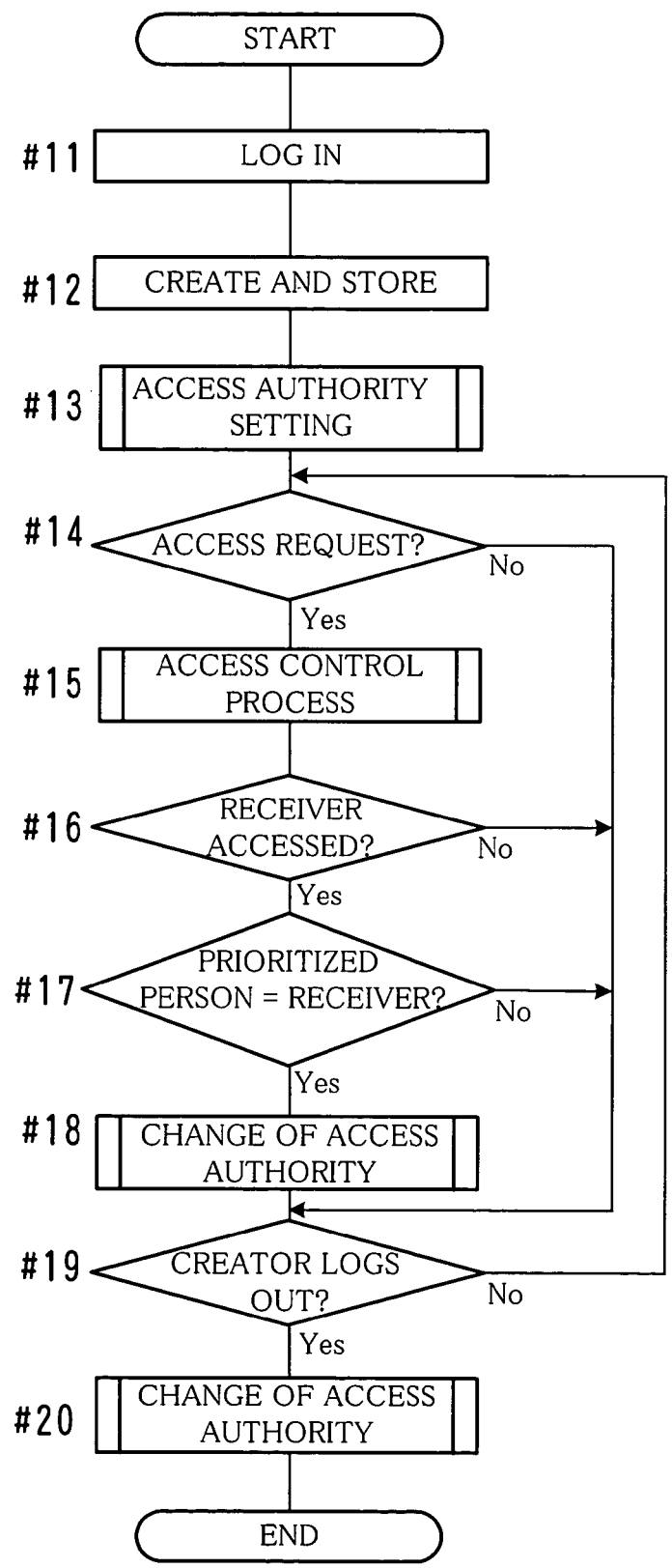
FIG. 7 is a flowchart showing an example of the sequence of the process performed by the multifunction device in association with document data.
Figure 8:
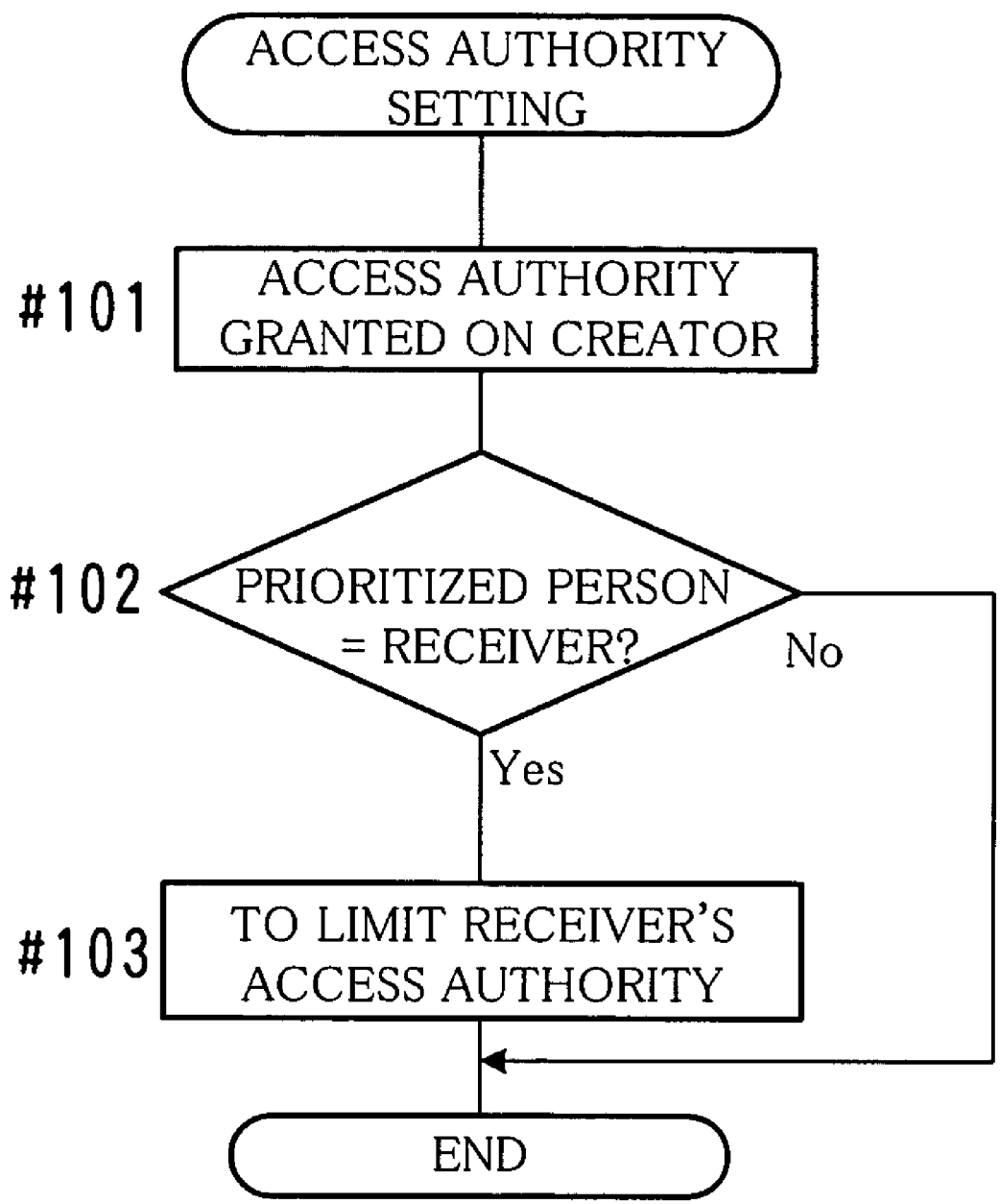
FIG. 8 is a flowchart showing an example of the sequence of the process of setting the access authority.
Figure 9:
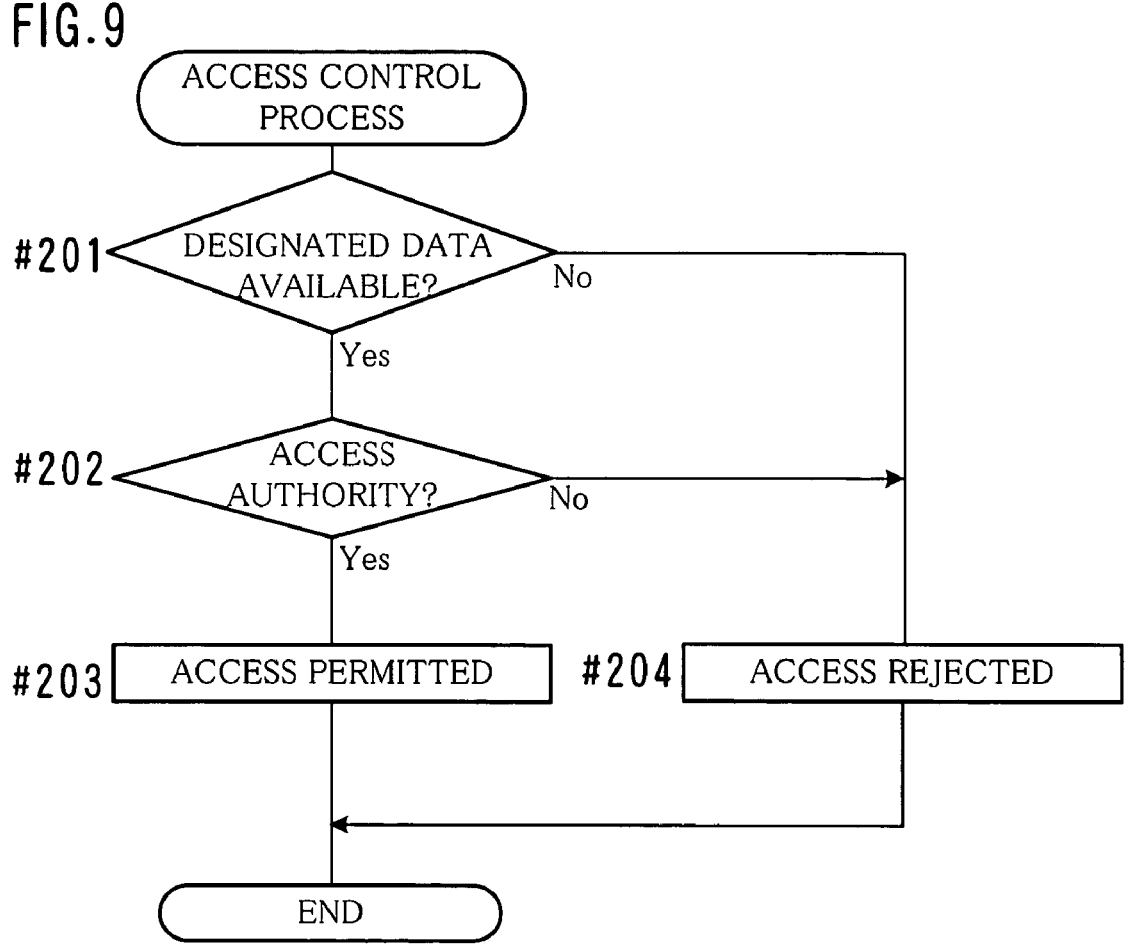
FIG. 9 is a flowchart showing an example of the sequence of the access control process.
Figure 10:
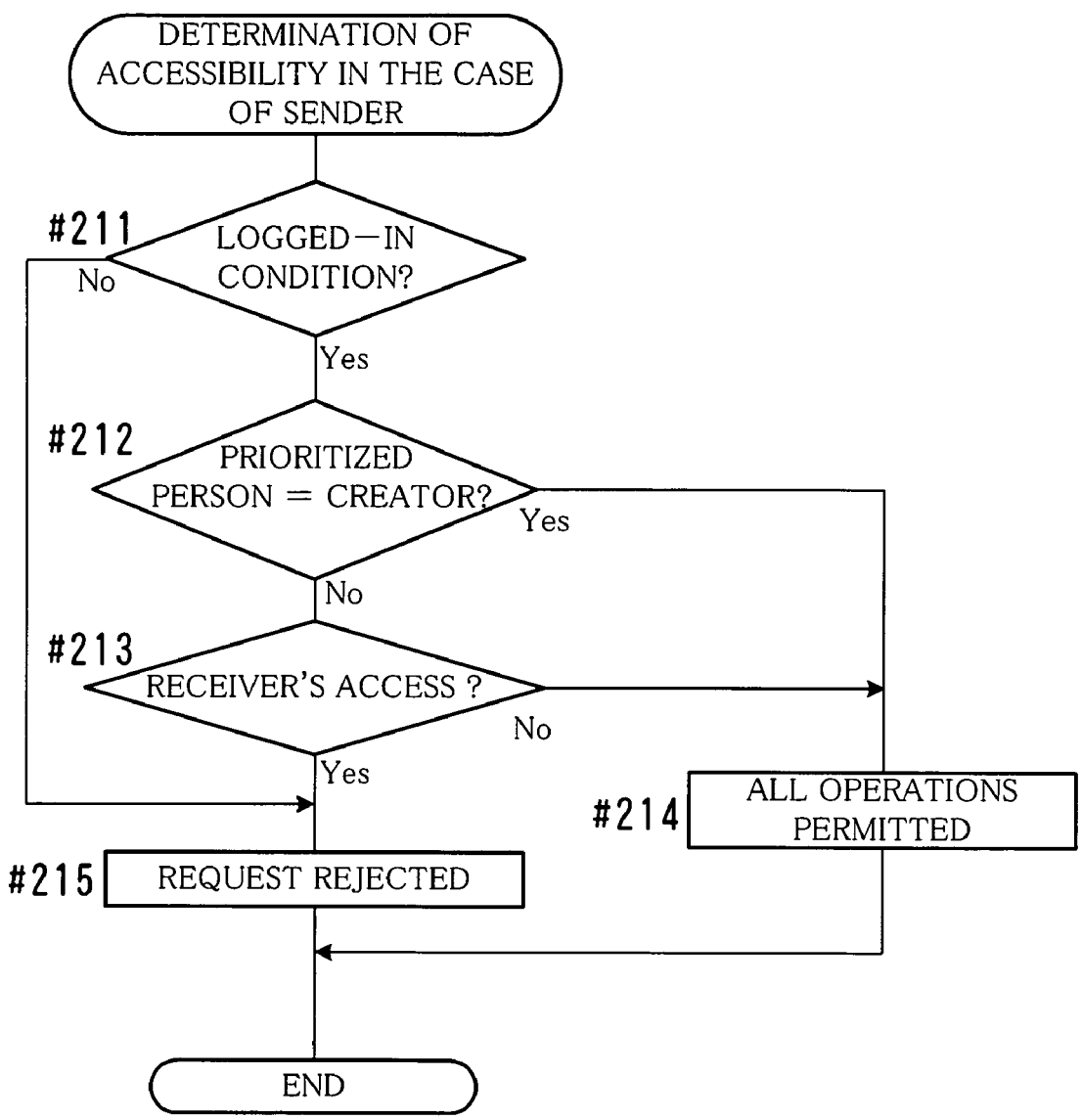
FIG. 10 is a flowchart showing an example of the sequence of the process of determination of accessibility in the case of a transmitting party.
Figure 11:
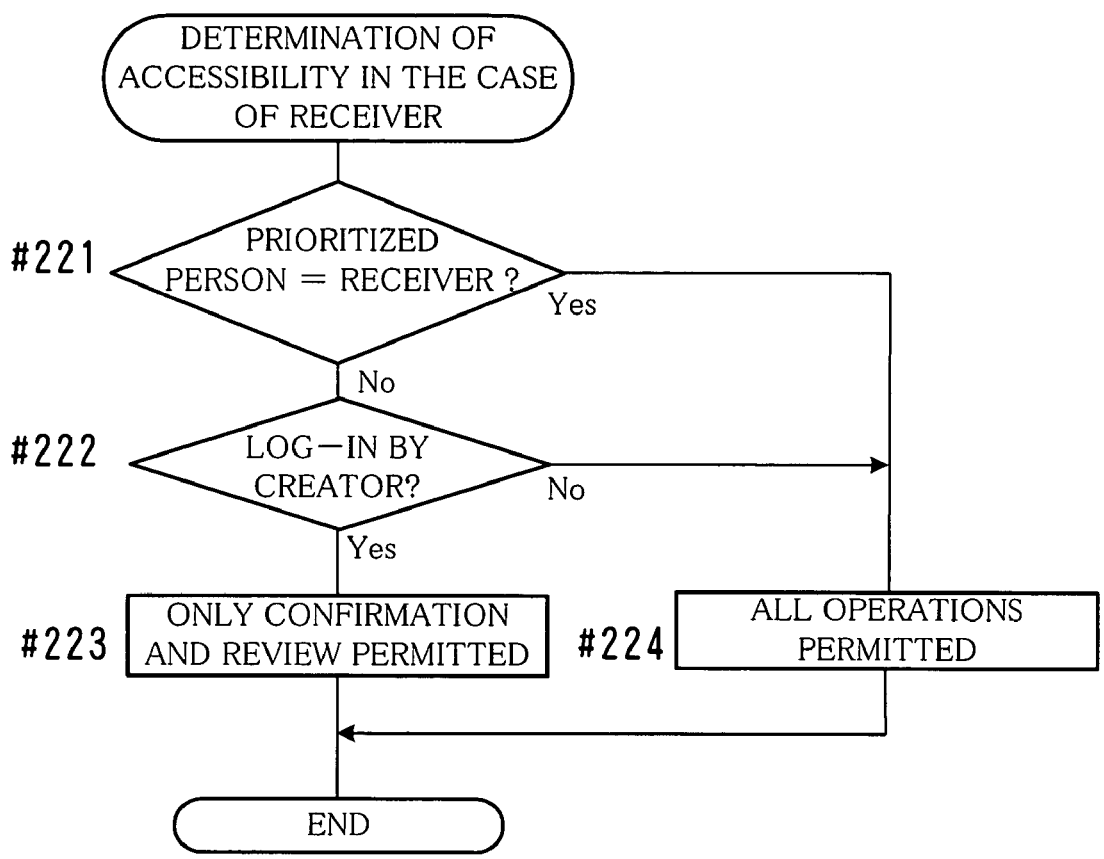
FIG. 11 is a flowchart showing an example of the sequence of the process of determination of accessibility in the case of a receiving party.
Figure 12:
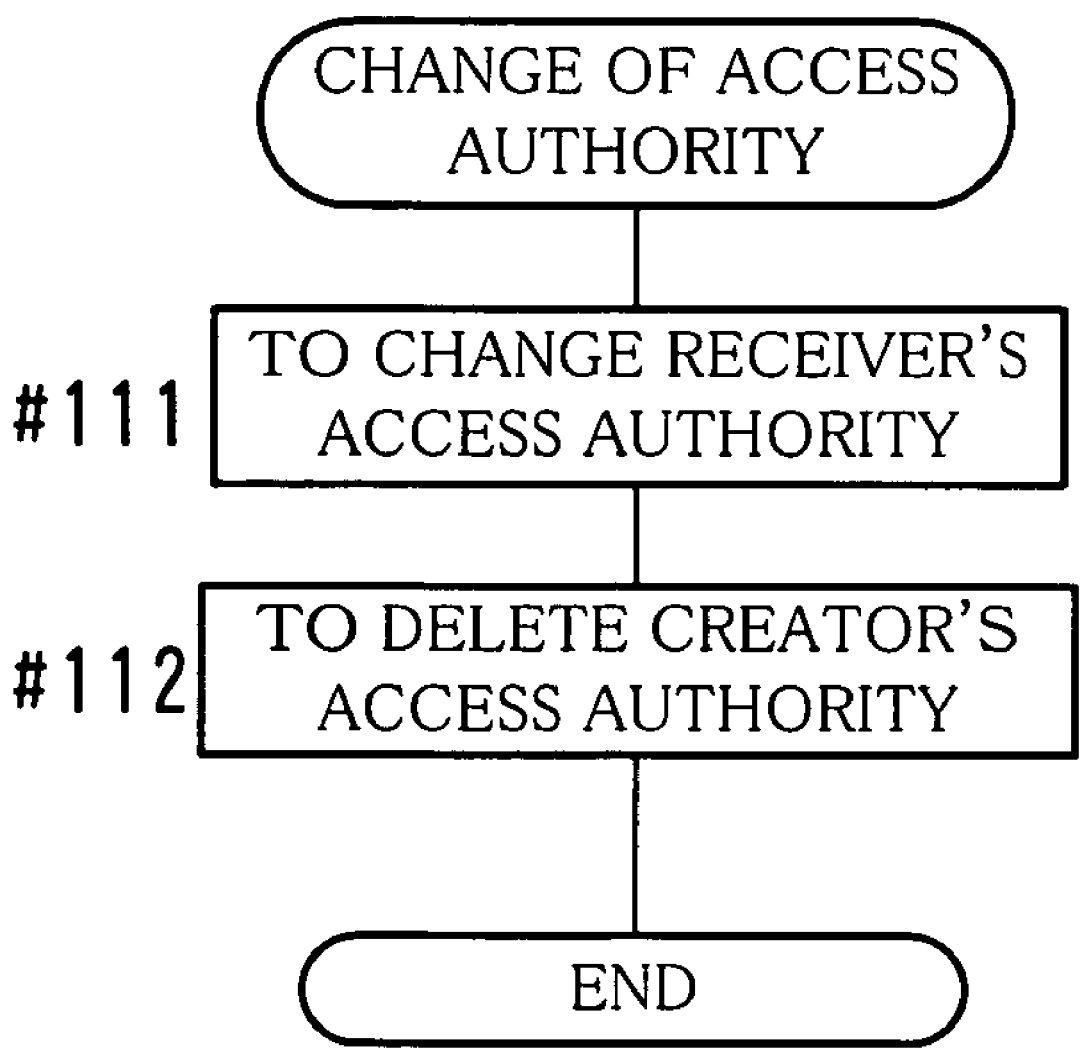
FIG. 12 is a flowchart showing an example of the sequence of the process of changing the access authority.
Figure 13:
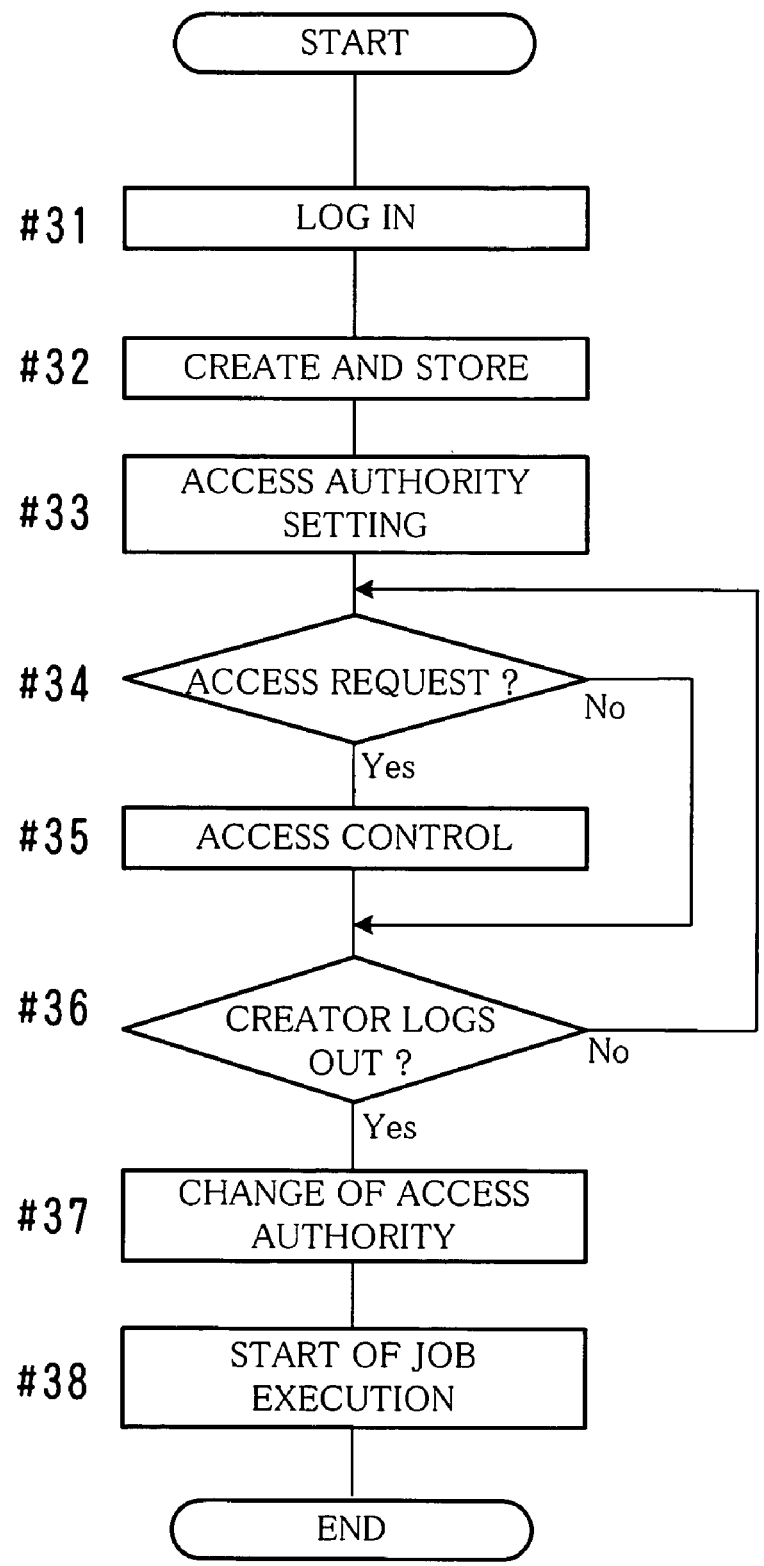
FIG. 13 is a flowchart showing an example of the sequence of the job data processing performed in the multifunction device.

FIG. 7 illustrates a flowchart showing an example of the sequence of the process performed by the multifunction device 1 in association with the paper data 70; FIG. 8 illustrates a flowchart showing an example of the sequence of the process of setting the access authority; FIG. 9 illustrates a flowchart showing an example of the sequence of the access control process; FIG. 10 illustrates a flowchart showing an example of the sequence of the process of determination of accessibility in the case of a transmitting party; FIG. 11 illustrates a flowchart showing an example of the sequence of the process of determination of accessibility in the case of a receiving party; FIG. 12 illustrates a flowchart showing an example of the sequence of the process of changing the access authority; and FIG. 13 illustrates a flowchart showing an example of the sequence of the job data processing performed in the multifunction device 1.

The multifunction device 1 performs processes associated with the transmission and reception of and access to the document data 70 in the manner as shown in FIG. 7. Specifically, when the user inputs his or her ID and password, verification as to the identity of the user is carried out at step #11. After the user has been verified as the right user, document data 70 descriptive of a document, for example, created by such user are received from the terminal 2 and are then stored in the box B of any other user designated by such user at step #12. At this time, the access authority with respect to such document data 70 is also set at step #13 as shown in FIG. 8. In other words, the data access authority information 81 shown in FIG. 6 is changed at step #101 of FIG. 8 so that the read, write and delete authorities (and, hence, the full access authority) can be granted to the user who is the sender (document creator) of the document data 70.

Also, if the person prioritized to the box B where the data are to be stored is described in the priority information 82 (See FIG. 4) as the "document creator" as indicated by Yes at step #102, the data access authority information 81 is changed or otherwise altered so that the sender, that is, the user who is the owner of the box B, can be given only the read authority to read the document data 70 at step #103. On the other hand, if the prioritized person is the "receiver" as indicated by No at step #102, no access authority is changed in relation to such receiver. In other words, as indicated by the box access authority information 80, the receiver is entitled to make full access to the document data 70.

Referring again to FIG. 7, in the event that the multifunction device 1 receives a request to access the document data 70, which have been newly stored (or received) at step #12, as indicated by Yes at step #14, the access control process as shown in FIG. 9 is executed at step #15.

Specifically, referring to FIG. 9, in the event that the data to which the request has been made, that is, the document data 70 designated by the request are stored as indicated by Yes at step #201 and, at the same time, the access authority to make access to the document data 70 is granted to the user having made such request as indicated by Yes at step #202, the access is enabled at step #203. On the other hand, in the event that no document data 70 is stored as indicated by No at step #201, or no access authority is granted to the user having made such request as indicated by No at step #202, the access is rejected at step #204.

Whether or not the user has the access authority is determined in the following manner based on the box access authority information 80 and the data access authority information 81 as hereinbefore described. Specifically, as shown in FIG. 10, only where the user making the request is the sender or document creator of such document data 70, such user is authorized at step #214 to perform all of the operations including reading, writing and deletion of such document data 70, provided that such user after the document data 70 have been stored in the box B is kept logging in without logging out as indicated by Yes at step #211 and that the priority information 82 indicates that the person prioritized to the box B is the "document creator" as indicated by Yes at step #212. The user is also authorized at step #214 to perform all of the operations even where the log-in condition persists as indicated by Yes at step #211, the prioritized person is the "receiver" as indicated by No at step #212 and the owner of the box B has not ever made access to the document data 70 as indicated by Yes at step #213.

In the event that after the document data 70 have been stored in the box B, the user who is the document creator has even once logged out as indicated by No at step #211, the request to access is rejected at step #215. Also, in the event that even though the log-in condition continues as indicated by Yes at step #211, the prioritized person is the "receiver" as indicated by No at step #212 and the owner of the box B has once made access to the document data 70 as indicated by Yes at step #213, the request to access is similarly rejected at step #215.

On the other hand, where the user having made the request is the receiver of the document data 70, that is, the owner of the box B to which the document data 70 are addressed, and if the priority information 82 indicates that the person prioritized to the box B is the "receiver" as indicated by Yes at step #221 shown in FIG. 11, such user is authorized to perform all of the operations at step #224. Where the prioritized person is the "document creator" as indicated by No at step #221 and, at the same time, such user has never logged out yet after the document data 70 have been stored as indicated by Yes at step #222, the user is authorized to read the document data 70 at step #223. However, in the event that such document creator has once logged out as indicated by No at step #222, such user is authorized to perform all of the operations at step #224.

Referring again to FIG. 7, in the event that the request to access the document data 70 originates from the receiver of the document data 70 as indicated by Yes at step #16 and, at the same time, the priority information 82 indicates that the person prioritized to the box B owned by the receiver is the "receiver" as indicated by Yes at step #17, the access authority with respect to only such document data 70 is changed at step #18. In other words, as shown in FIG. 12, the data access authority information 81 is changed or otherwise altered at successive steps #111 and #112 so that the access authority to make access to the document data 70 is the full access authority to such receiver and no access is permitted to the sender (the document creator).

Also, along with the receipt of the request to access, monitoring is made at step #19 to determine if the document creator of the document data 70 has logged out. In the event that it is detected as indicated by Yes at step #19 that the document creator has logged out, a process to change the access authority as shown in FIG. 12 is carried out at step #20. In other words, as discussed previously, the data access authority information 81 is changed or otherwise altered so that the access authority granted to the receiver in connection with the document data 70 will become the full access authority and, at the same time, the access authority granted to the document creator may be stricken out.

In parallel with the process shown in and described with reference to the flowchart of FIG. 7, the multifunction device 1 also performs a process shown in the flowchart of FIG. 13. Referring now to FIG. 13, when the user inputs the user ID and the password to the terminals 2, verification as to the identity of the user is carried out at step #31 making reference to the inputted ID and password. Should it be verified that the user is the right one, job data 71 is created according to instructions from the user and are then stored in the temporary storage box BT at step #32. At this time, the data access authority information 81 is so changed at step #33 that the access authority in connection with the job data 71 can be granted to such user.

It is, however, to be noted that depending on the content of the job, the user may be granted the access authority different from that granted in the case of the document data 70. By way of example, in the case of the job data 71 necessary to execute a job of transferring data, the read, write and delete authorities, associated with reading, writing and deletion of the contents of the job data 71, and the read, write and delete authorities, associated with reading, writing and deletion of the addressee to which the data are to be transferred, may be granted as the access authority.

In the event that the request to make access to the job data 71 stored in the temporary storage box BT is received from the user as indicated by Yes at step #34, the access is permitted if such user has the access authority, but is rejected if he or she has no access authority at step #35.

In the event that the user having made the job instruction logs out as indicated by Yes at step #36, the access authority granted to such user in connection with access to the job data 71 associated with such job instruction is deleted at step #37, followed by step #38 at which execution of the job based on the job data 71 starts.

According to the foregoing embodiment of the present invention, even when a user stores data in the box owned by any other user or a system box, that is, the temporary storage box, access to such data can be made so long as such user keeps logging in or before such any other user makes access to such data. Accordingly, the user can be permitted to make access to the data stored in the box owned by any other user, while the owner of such box is warranted a high security and conveniences of data management.

Also, in the event the user and any other user attempt to make access to the data simultaneously, the write and delete authorities are granted to one of them and only read authority is granted to the other of them. Accordingly, in the event of the access attempted simultaneously, the consistency of the data can be retained advantageously.

In describing the foregoing preferred embodiment of the present invention, reference has been made to the access control of the data in the multifunction device 1. However, the present invention can be equally applied to the data access control in any other machine and equipment such as a server, for example, an FTP server or an SMB server. In such case, when, for example, the user logging in the multifunction device 1 adds and stores the document data 70 and others in a storage area (e.g., a folder or a directory) of any other user in the server machine, such user may be granted the access authority with respect to such document data 70 before he or she logs out. This access authority may be deleted the first thing he or she log out.

If the person prioritized is not set in the priority information 82 shown in FIG. 4, the default value determined by the administrator of the multifunction device 1 may be employed. By way of example, with respect to the box B that is empty of the preset value of the priority information 82, the "receiver" may be set as a default prioritized person.

In addition to the foregoing, architectures of the whole or parts of the multifunction device 1, and the contents and sequences of processes may be altered or otherwise modified in any way provided that they do not depart from the spirit and scope of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An access control system for managing an access authority with respect to data stored in a storage device, the system comprising:
   a control unit;
   the control unit comprising:
   a storage controlling portion for storing data in the storage device, the data are data to be given from a giving user who has logged in the access control system to a receiving user who receives the data and who is different from the giving user; and
   an access authority managing portion for granting an concurrent access authority to both the giving user and the receiving user to provide concurrent access to the data, in the event that the data are stored in the storage device; and
   wherein the access authority managing portion erases the access authority which has been granted to the giving user, when the giving user logs out of the access control system, while retaining access authority for the receiving user.

2. An access control system for managing an access authority with respect to data stored in a storage device having a storage area for each of users, the system comprising:
   a control unit;
   the control unit comprising:
   a storage controlling portion for causing data, which are to be given by giving user, then logging in the access control system, to a receiving user, to be stored in the storage area owned by the receiving user; and
   an access authority managing portion for granting an access authority to make access to the data to be given by the giving user, concurrently to both of the giving user and the receiving user who is an owner of the storage area in the event that the data to be given by the giving user are stored in the storage area and, also, for erasing the access authority, which has been granted to the giving user, when the giving user logs out the access control system.

3. An image forming device provided with storage areas in a storage device for storage of data, the storage areas being provided one for each of users, the image forming device comprising:
   a control unit;
   the control unit comprising:
   a storage controlling portion for causing data, which are to be given by a giving user who has logged in the image forming device to a receiving user, to be stored in the storage area owned by the second receiving user; and
   an access authority managing portion for granting an access authority to make access to the data to be given by the giving user, concurrently to both of the giving user and the receiving user who is an owner of the storage area in the event that the data to be given by the giving user are stored in the storage area and, also, for erasing the access authority, which has been granted to the giving user, when the giving user logs out the image forming device.

4. The image forming device as claimed in claim 3, wherein the access authority managing portion grants only a read authority to read the data to the receiving user as the access authority when the giving user has access authority to the data, but grants a full access authority as the access authority to the receiving user when the giving user logs out the image forming device.

5. The image forming device as claimed in claim 4, wherein the access authority managing portion grants, as the full access authority, an authority with which the data can be read, updated and deleted.

6. The image forming device as claimed in claim 3, wherein the access authority managing portion erases the access authority granted to the giving user, when the receiving user makes access to the data regardless of a timing at which the giving user logs out the image forming device.

7. The image forming device as claimed in claim 3, further comprising a prioritized person setting portion for setting a person prioritized to make access to the data for each of the storage areas and wherein the access authority managing portion is operable;
   if the person prioritized to the storage area, in which the data are stored, is the giving user, to grant, as the access authority, only a read authority to read the data to the receiving user when the data are stored in the storage area, but to grant, as the access authority, a full access authority to the receiving user when the giving user logs out the image forming device, and
   if the person prioritized to the storage area, in which the data are stored, is the receiving user, to grant, as the access authority, a full access authority to both of the giving and receiving users when the data are stored in the storage area, but to erase the access authority, granted to the giving user, when the receiving user makes access to the data and regardless of the timing at which the giving user logs out the image forming device.

8. An image forming device having a process executing portion for executing a process based on job data, the device comprising:
   a control unit;
   the control unit comprising:
   a storage controlling portion for storing in a predetermined storage area in a storage device, the job data descriptive of contents of the process designated by a user who has logged in the image forming device; and
   an access authority managing portion for granting an access authority for enabling the user, who designated the process, to make access to the job data, to the user when the job data are stored in the predetermined storage area and, also, for erasing the access authority when the user logs out the image forming device.

9. The image forming device as claimed in claim 8, wherein the process executing portion starts the process based on the job data, after the user who has designated the process logs out the image forming device.

10. The image forming device as claimed in claim 8, wherein the access authority managing portion grants, as the access authority, an authority to read, update and delete the job data and an authority to read, update and delete an addressee to which the job data are transferred, if the job data are associated with transfer of the data to the designated addressee.

11. An access managing method of managing an access authority with respect to data stored in a storage device, the method comprising:
   storing data in the storage device, the data are data to be given from a giving user who has logged in to a receiving user that is to receive the data and that is different than the giving user; and
   granting concurrent access authority to both the giving user and the receiving user to provide concurrent access to the data, in the event that the data are stored in the storage device; and
   erasing the access authority which has been granted to the giving user, when the giving user logs out of an access control system, while retaining access authority for the receiving user.

12. A non-transitory computer readable storage medium storing a computer program product for implementing a process in a computer which is used to manage an access authority with respect to data stored in a storage device, the process comprising:
   storing data in the storage device, the data are data to be given from a giving user who has logged in to a receiving user that is to receive the data and that is different than the giving user; and
   granting concurrent access authority to both the giving user and the receiving user to provide concurrent access to the data, in the event that the data are stored in the storage device; and
   erasing the access authority which has been granted to the giving user, when the giving user logs out of an access control system, while retaining access authority for the receiving user.

* * * * *